(12) United States Patent
Barbara et al.

(10) Patent No.: US 12,254,354 B2
(45) Date of Patent: Mar. 18, 2025

(54) RESOURCE CONSERVATION FOR CONTAINERIZED SYSTEMS

(71) Applicant: Google LLC, Mountain View, CA (US)

(72) Inventors: Justin Santa Barbara, Atlanta, GA (US); Timothe Hockin, Sunnyvale, CA (US); Robert Bailey, Seattle, WA (US); Jeffrey Johnson, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/433,389

(22) Filed: Feb. 5, 2024

(65) Prior Publication Data

US 2024/0176661 A1    May 30, 2024

Related U.S. Application Data (63) Continuation of application No. 17/159,127, filed on Jan. 26, 2021, now Pat. No. 11,907,762, which is a continuation of application No. 16/174,907, filed on Oct. 30, 2018, now Pat. No. 10,922,138.

(51) Int. Cl.
    *G06F 9/50*         (2006.01)

(52) U.S. Cl.
    CPC .......... *G06F 9/5022* (2013.01); *G06F 9/5005* (2013.01); *G06F 9/5011* (2013.01); *G06F 9/5016* (2013.01); *G06F 9/5027* (2013.01); *G06F 9/50* (2013.01)

(58) Field of Classification Search
    None
    See application file for complete search history.

(56) References Cited

U.S. PATENT DOCUMENTS

| | | |
|---|---|---|
| 2005/0038772 A1 | 2/2005 | Colrain |
| 2006/0048159 A1 | 3/2006 | Yazawa et al. |
| 2010/0186019 A1 | 7/2010 | Branson et al. |
| 2015/0347181 A1 | 12/2015 | Myrick et al. |
| 2016/0070586 A1 | 3/2016 | Banzhaf et al. |
| 2016/0357572 A1 | 12/2016 | Myrick et al. |
| 2019/0379590 A1 | 12/2019 | Rimar |

(Continued)

OTHER PUBLICATIONS

International Search report for the related application No. PCT/US2019/053067 dated Sep. 26, 2019.

(Continued)

*Primary Examiner* — Qing Yuan Wu
(74) *Attorney, Agent, or Firm* — Honigman LLP; Brett A. Krueger (57) ABSTRACT

A method for conserving resources in a distributed system includes receiving an event-criteria list from a resource controller. The event-criteria list includes one or more events watched by the resource controller and the resource controller controls at least one target resource and is configured to respond to events from the event-criteria list that occur. The method also includes determining whether the resource controller is idle. When the resource controller is idle, the method includes terminating the resource controller, determining whether any event from the event-criteria list occurs after terminating the resource controller, and, when at least one event from the event-criteria list occurs after terminating the resource controller, recreating the resource controller.

18 Claims, 8 Drawing Sheets

(56) References Cited

U.S. PATENT DOCUMENTS

2020/0099753 A1* 3/2020 Fleck .................. H04L 67/145

OTHER PUBLICATIONS

US 2010/186019 A1 (Branson Michael John [US] et al.) Jul. 22, 2010 (Jul. 22, 2010) abstract paragraph [0040]—paragraph [0041] figures 7, 8.
US 2006/048159 A1 (Yazawa Hiroshi [JP] et al.) Mar. 2, 2006 (Mar. 2, 2006) the whole document.
US 2005/038772 A1 (Colrain Carol [US]) Feb. 17, 2005 (Feb. 17, 2005) the whole document.
Jing Xu et al: "On the Use of Fuzzy Modeling in Virtualized Data Center Management", Autonomic Computing, 2007. ICAC '07. Fourth International Conference ON, IEEE, PI , Jun. 1, 2007 (Jun. 1, 2007), pp. 25-25, XP031116542, ISBN: 978-0-7695-2779-6 the whol e document.
USPTO. Office Action relating to U.S. Appl. No. 17/159,127, dated Jul. 26, 2023.

\* cited by examiner

RESOURCE CONSERVATION FOR CONTAINERIZED SYSTEMS

CROSS REFERENCE TO RELATED APPLICATIONS

This U.S. patent application is a continuation of, and claims priority under 35 U.S.C. § 120 from, U.S. patent application Ser. No. 17/159,127, filed on Jan. 26, 2021, which is a continuation of U.S. patent application Ser. No. 16/174,907, now U.S. Pat. No. 10,922,138, filed on Oct. 30, 2018. The disclosures of these prior applications are considered part of the disclosure of this application and are hereby incorporated by reference their entireties.

TECHNICAL FIELD

This disclosure relates to conserving system resources in containerized systems.

BACKGROUND

In general, it is well known that personal computers reduce resource usage for programs that are idle. For example, Unix-family operating systems (OSes) express this when processes are blocked reading a file (which might be a network socket or pipe). If there is no input to be read, the blocked thread will not be scheduled onto the processor (as this allows more threads to exist than available CPU cores). OSes can also perform memory paging to over-subscribe memory, and an idle process will often be paged out. Some cloud-based services (via distributed systems) offer containerized orchestration systems that frequently have idle containers or processes. For example, KUBERNETES® (the KUBERNETES® trademark is owned by the Linux Foundation) is built around the idea of controllers that act to reconcile the desired state of the world as expressed in resources, with the actual state of the world in some other system or some other Resource. For example, a container that is running a controller process often spends most of its time waiting for changes to objects in the application programming interface (API), and if those objects are slow-changing, the controller may be essentially idle. But even if the local node OS of the controller is able to reduce the resource requirements for the process, the scheduler of the orchestration system cannot process that information.

SUMMARY

One aspect of the disclosure provides a method for conserving resources of containerized systems. The method includes receiving, at data processing hardware, an event-criteria list from a resource controller. The event-criteria list includes one or more events watched by the resource controller and the resource controller controls at least one container and is configured to respond to events from the event-criteria list that occur. The at least one container encapsulates an application process. The method also includes determining, by the data processing hardware, whether the resource controller is idle. When the resource controller is idle, the method includes terminating, by the data processing hardware, the resource controller and determining, by the data processing hardware, whether any event from the event-criteria list occurs after terminating the resource controller. The method also includes, when at least one event from the event-criteria list occurs after terminating the resource controller, recreating, by the data processing hardware, the resource controller.

Implementations of the disclosure may include one or more of the following optional features. In some implementations, determining whether the resource controller is idle includes polling the resource controller. Additionally or alternatively, determining whether the resource controller is idle may include analyzing events that have occurred during a threshold period of time and determining that the resource controller is idle when no events on the event-criteria list have occurred within the threshold period of time.

In some examples, terminating the resource controller includes scaling a deployment size of the resource controller to zero while recreating the resource controller includes scaling a deployment size of the resource controller to one. Optionally, the event-criteria list includes a timer event. In some implementations, determining whether any event on the event-criteria list occurred includes polling data.

In some examples, the method includes determining, by the data processing hardware, whether a terminate time period since the resource controller has been terminated satisfies a threshold period of time. In response to determining that the terminate time period does satisfy the threshold period of time, the method includes recreating, by the data processing hardware, the resource controller. The method, in some implementations, includes determining, by the data processing hardware, whether the resource controller requires maintenance or reconfiguration, and in response, recreating, by the data processing hardware, the resource controller. Receiving an event-criteria list from a resource controller may include receiving a plurality of event-criteria lists from a plurality of resource controllers executing simultaneously, where each event-criteria list is associated with a respective resource controller. A quantity of resource controllers executing simultaneously may be based upon system resources. The method may further include determining, by the data processing hardware, whether any event on multiple event-criteria lists occurred simultaneously. In response to determining that an event on multiple event-criteria lists occurred simultaneously, the method may include recreating, by the data processing hardware, a group of resource controllers sequentially, each resource controller of the group of resource controllers associated with a respective event-criteria list of the multiple event-criteria lists. Recreating the group of resource controllers sequentially includes, in some examples, recreating the group of resource controllers sequentially based on a priority of each resource controller.

The method may also include recreating, by the data processing hardware, the resource controller based on a system metric. The system metric, in some implementations, is a measure of system resources. Optionally, the event-criteria list includes a dynamic event-criteria list. The method may also include, prior to terminating the resource controller when the resource controller is idle, determining, by the data processing hardware, whether a measure of system resources satisfies a system resource threshold. When both the measure of system resources satisfies the threshold and the resource controller is idle, the method includes terminating, by the data processing hardware, the resource controller. The measure of system resources may include a measure of system processing/computing, network access, storage, and/or memory resources. When receiving the event-criteria list from the resource controller, the method includes, in some examples, receiving the event-criteria list from a HyperText Transfer Protocol (HTTP) endpoint. The resource controller may be associated with a system resource reservation and terminating the resource controller then removes the system resource reservation.

Another aspect of the disclosure provides a system including data processing hardware and memory hardware in communication with the data processing hardware. The memory hardware stores instruction that when executed on the data processing hardware cause the data processing hardware to perform operations. The operations include receiving an event-criteria list from a resource controller. The event-criteria list includes one or more events watched by the resource controller and the resource controller controls at least one container and is configured to respond to events from the event-criteria list that occur. The at least one container encapsulates an application process. The operations also include determining whether the resource controller is idle. When the resource controller is idle, the operations include terminating the resource controller and determining whether any event from the event-criteria list occurs after terminating the resource controller. The operations also include, when at least one event from the event-criteria list occurs after terminating the resource controller, recreating the resource controller.

Implementations of this aspect of the disclosure may include one or more of the following optional features. In some implementations, determining whether the resource controller is idle includes polling the resource controller. Determining whether the resource controller is idle may additionally or alternatively include analyzing events that have occurred during a threshold period of time; and determining that the resource controller is idle when no events on the event-criteria list have occurred within the threshold period of time.

In some examples, terminating the resource controller includes scaling a deployment size of the resource controller to zero while recreating the resource controller includes scaling a deployment size of the resource controller to one. Optionally, the event-criteria list includes a timer event. In some implementations, determining whether any event on the event-criteria list occurred includes polling data.

In some examples, the operations include determining whether a terminate time period since the resource controller has been terminated satisfies a threshold period of time. In these examples, in response to determining that the terminate time period does satisfy the threshold period of time, the operations include recreating the resource controller. The operations, in some implementations, include determining whether the resource controller requires maintenance or reconfiguration and in response to determining that the resource controller requires maintenance or reconfiguration, recreating the resource controller. Receiving an event-criteria list from a resource controller may include receiving a plurality of event-criteria lists from a plurality of resource controllers executing simultaneously, where each event-criteria list is associated with a respective resource controller. A quantity of resource controllers executing simultaneously may be based upon system resources. The operations may then further include determining whether any event on multiple event-criteria lists occurred simultaneously. In response to determining that an event on multiple event-criteria lists occurred simultaneously, the operations may further include recreating a group of resource controllers sequentially, each resource controller of the group of resource controllers associated with a respective event-criteria list of the multiple event-criteria lists. Recreating the group of resource controllers sequentially includes, in some examples, recreating the group of resource controllers sequentially based on a priority of each resource controller.

The operations may also include recreating the resource controller based on a system metric. The system metric, in some implementations, is a measure of system resources. Optionally, the event-criteria list includes a dynamic event-criteria list. The operations may also include, prior to terminating the resource controller when the resource controller is idle, determining whether a measure of system resources satisfies a system resource threshold. When both the measure of system resources satisfies the threshold and the resource controller is idle, the operations may include terminating the resource controller. The measure of system resources may include a measure of system processing/computing, network access, storage, and/or memory resources. When receiving the event-criteria list from the resource controller, the operations include, in some examples, receiving the event-criteria list from an HTTP endpoint. The resource controller may be associated with a system resource reservation and terminating the resource controller then removes the system resource reservation.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Containerized applications, and the systems that orchestrate containerized applications (e.g., KUBERNETES®), are becoming increasingly popular due, at least in part, to advances in remote and distributed computing. Containerized applications (i.e., virtualization) allow for the existence of isolated user or application space instances. Each instance (i.e., container) may appear to the application as its own personal computer with access to all the resources necessary to execute (e.g., storage, network access, etc.). However, applications in containers will only be able to view and access resources assigned to its respective container. This facilities security, mobility, scaling, and upgrading of applications in a distributed or cloud environment.

A container typically will be limited to a single application or process. Some container-orchestration systems deploy pods as the smallest available computing unit. A pod is a group of one or more containers, each container within the pod sharing isolation boundaries (e.g., IP address). Controllers control resources in pods. Controllers are responsible for monitoring the health of pods, containers, and resources (and recreating the pods/containers if necessary), replicating and scaling the pod, and monitoring for external (to the pod) events. Currently, pod controllers usually run constantly, and each controller has a resource overhead (e.g., a controller might be, for example, a go process that consumes processor and memory resources). This has led to the bundling of controllers together into a single process, which saves resources, but runs counter to the design goals of containerized systems (where each container or pod is independent from others). Further, this method is cumbersome as the source code for each controller must be combined into a single binary, which makes updating a single controller arduous at best. Moreover, controllers that use different library versions or different languages or runtimes might be impossible to combine into a single binary.

Operating systems (OSes) of personal computers often essentially suspend processes when the processes are idle. For example, a process that is blocked while waiting to read a file will not be scheduled onto the processor until the file is available. Operating systems may also perform memory paging to over-subscribe memory, and an idle process will often be paged out. Similarly, containerized applications are frequently idle. For example, a containerized orchestration system controller often spends most of its time waiting for changes to objects in the application programming interface (API), which may essentially leave the controller idle between changes. However, even though the local node OS of the controller may able to reduce the resource requirements for the process through scheduling or memory paging, the orchestration system scheduler cannot process that information and a typical orchestration system configuration commands the OS not to page-out processes (e.g., disables swap) and tries to avoid resource over-commitment for more consistent response times. Thus, it may be difficult, if not impossible, for a typical containerized system to over-subscribe system resources. Implementations of the present disclosure solve these technical difficulties by creating a master controller that allows for resource conservation in containerized systems without the need for major modifications to the containerized system.

Figure 1:
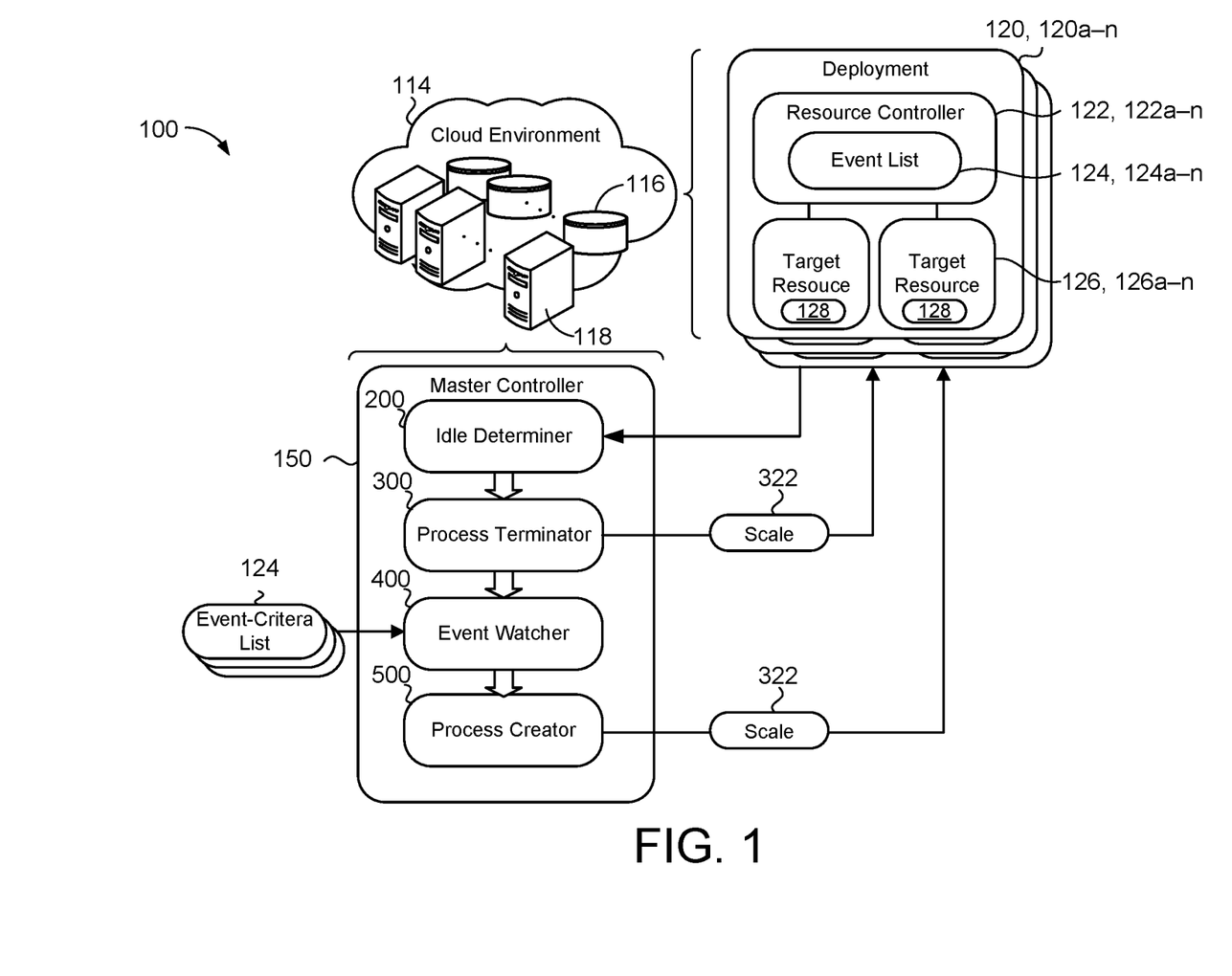
FIG. 1 is a schematic view of an example system for conserving resources in containerized systems.

Implementations herein are directed toward systems and methods for conserving resources in containerized systems without requiring modification to the controllers or containers. Referring to FIG. 1, in some implementations, an example system 100 includes a remote system 114. The remote system 114 may be a single computer, multiple computers, or a distributed system (e.g., a cloud environment) having scalable/elastic computing resources 118 (e.g., data processing hardware 810 (FIG. 8)) and/or storage resources 116 (e.g., memory hardware 820 (FIG. 8)). The remote system 114 executes one or more deployments 120, 120a-n, and each deployment 120 including a resource controller 122, 122a-n and a group of one or more target resources 126, 126a-n controlled by the resource controller 122 of the corresponding deployment 120. For example, the target resource 126 may be a pod, the pod including one or more containers 128, 128a-n, with each container 128 executing an application or process. In other examples, the target resource is a load balancer, Domain Name System (DNS) records, or other cloud resources. In the example shown, each resource controller 122 is associated with at least one event-criteria list 124, 124a-n, while each target resource 126 (e.g., pod) executes a container 128 (i.e., an application or process). Each target resource 126 within a deployment 120 may be co-located and capable of sharing some resources (e.g., network access) with other target resources 126 within the same deployment 120 while prohibiting the sharing of other resources (e.g., memory). In other words, a given target resource 126 within a respective deployment 120 may not be permitted to share resources with other target resources 126 that are located within the same deployment 120.

In some implementations, each controller 122 within a respective deployment 120 is capable of controlling each pod 126 (and the containers 128 associated therewith) of the respective deployment 120 by scaling (increasing or decreasing) a deployment size or scale 322 of the respective deployment 120 and/or pods 126. The deployment size may be a replica field. For example, if the deployment size 322 increases (e.g., changes from one to two), the number of instances (e.g., pods 126) within the respective deployment 120 increases (e.g., the number of pods 126 increases from one to two). Similarly, if the deployment size 322 decreases, the number of instances (e.g., pods 126) within the respective deployment 120 decreases. In some examples, setting the deployment size 322 of the deployment 120 to zero terminates or suspends execution of the respective deployment 120 and the one or more pods 126 and containers 128 within the respective deployment 120.

The event-criteria list 124 associated with each controller 122 includes a specification of events 125 that are relevant to the pods 126 or containers 128 within the respective deployment 120. Events 125 may take any number of forms (e.g., API object changes, http request, message in a queue, email, time, system load, other system metrics, etc.). For example, a Domain Name System (DNS) application that responds to DNS changes would require notification when changes to the DNS API objects occur, and would also either require notification when the target DNS records are changed, or could use a timer to poll for target changes. The controller 122 watches or monitors for occurrences of each event 125 on the event-criteria list 124. These events 125 may occur rarely. For instance, keeping with the DNS example, changes to DNS typically are infrequent, and therefore the DNS application and its corresponding controller 122 will generally be idle until the occurrence of a DNS change. Despite being idle, the deployment 120 maintains the same system resource reservation set for an active state in order to deliver reasonable response times. That is, the deployment 120 requires a typical system to reserve a set amount of system resources (e.g., memory/storage/computing/network access) regardless of the state of the deployment 120 (i.e., idle, active, etc.).

With continued reference to FIG. 1, the example system 100 includes a master controller 150 that executes on the remote system 114 and communicates with each resource controller 122 of the deployments 120. The master controller 150 may monitor execution of each controller 122 deployed on the remote system 114 and terminate/suspend execution of controllers 122 that become idle in order to recover unused resources reserved for the idle target resources 126. For instance, an idle determiner 200 of the master controller 150 may determines when a deployed controller is idle and a process terminator 300 of the master controller 150 may terminate, or otherwise suspend, execution of the deployment 120, thereby recovering the resources reserved for the terminated deployment 120. In some implementations, the process terminator 300 terminates the deployment 120 by setting the deployment size (e.g., scale) 322 of the deployment 120 to zero.

In order to respond to changes that may subsequently occur, the master controller 150 may further implement an event watcher 400. In the example shown, the event watcher 400 receives the event-criteria list 124 from the controller 122 of the respective deployment 120 before the process terminator 300 terminates the respective deployment 120. Accordingly, the event watcher 400 permits the master controller 150 to watch for events 125 in the event-criteria list 124 that are associated with a deployment 120 that has since been terminated/suspended. In other words, since terminating/suspending execution of the deployment 120 consequently terminates/suspends the ability of the corresponding controller 122 to watch for the events 125 in the event-criteria list 124, the master controller 150 assumes the responsibility of the controller 122 by receiving the event-criteria list 124 to watch for the occurrence of the events 125 in the event-criteria list 124 when execution of the deployment 120 (and corresponding controller 122) is suspended/terminated. When the event watcher 400 detects or determines that an event 125 in the event-criteria list 124 has occurred, a process creator 500 of the master controller 150 may redeploy the respective deployment 120 (e.g., by setting the deployment size (e.g., scale) 322 to one).

Figure 2:
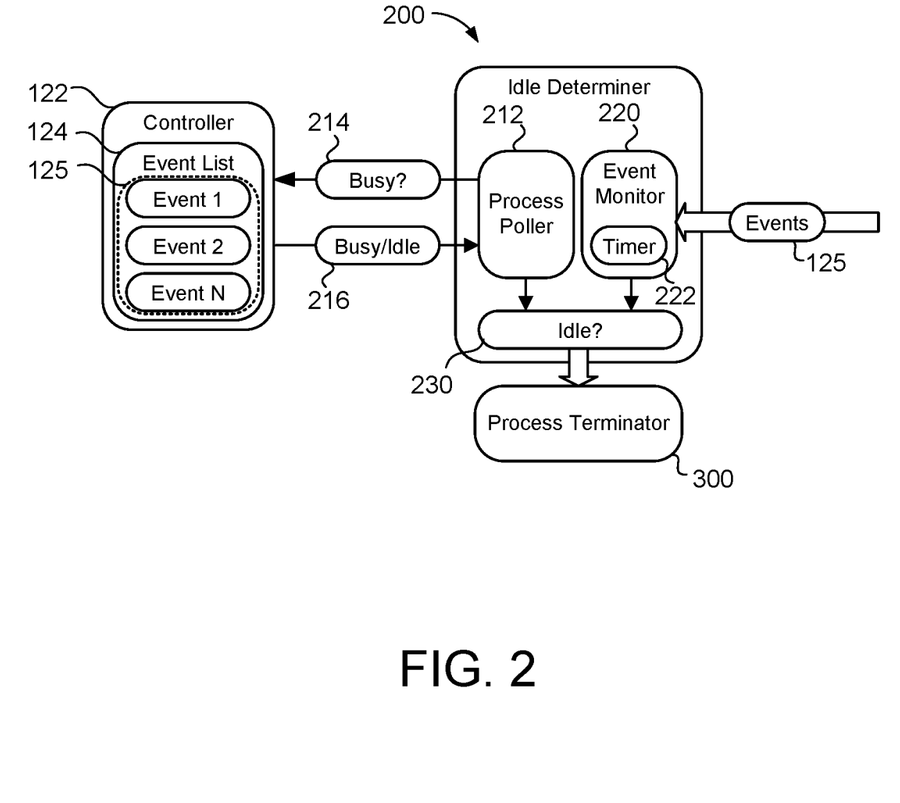
FIG. 2 is a schematic view of example components of an idle determiner of the system of FIG. 1.

Referring now to FIG. 2, in some implementations, the idle determiner 200 includes a process poller 212. The process poller 212 periodically (e.g., once a second, once a minute, etc.) polls 214 the controller 122 to determine whether or not the corresponding resource controller 122 is idle. For instance, the process poller 212 may poll 214 the controller 122 to scrape details 216 from the controller 122 to determine if the controller 122 is idle. The details may include the respective event-criteria list 124, processing state of the controller 122, version information of observed events, etc. Additionally or alternatively, the controller 122 may voluntarily expose the details 216 by exposing a metric (e.g., time since last activity) that the poller 212 reads directly to determine idleness. In addition to, or in lieu of the process poller 212, the idle determiner 200 may implement an event monitor 220 configured to receive events 125 that may be on the event-criteria list 124 of the controller 122. When the event monitor 220 receives an event 125, the event monitor 220 determines whether the event 125 includes one of the events 125 on the event-criteria list 124 of the controller 122 or an event on another event-criteria list 124 from a different controller 122. If the event monitor 220 does not receive any events 125 that are on the event-criteria list 124 for a threshold period of time (determined by timer 222), the event monitor 220 may conclude that the controller 122 is idle. If the process poller 212 and/or the event monitor 220 determine that the controller 122 is idle, the idle determiner 200 may send an idle determination 230 to the process terminator 300 indicating that the controller 122 (and the respective deployment 120) is idle. In some implementations, determining whether the controller 122 is idle includes analyzing further events caused by the controller 122 when it has finished responding to an event. For example, a controller 122 may update the object with an "observedGeneration" field when the controller 122 finishes processing changes.

Figure 3:
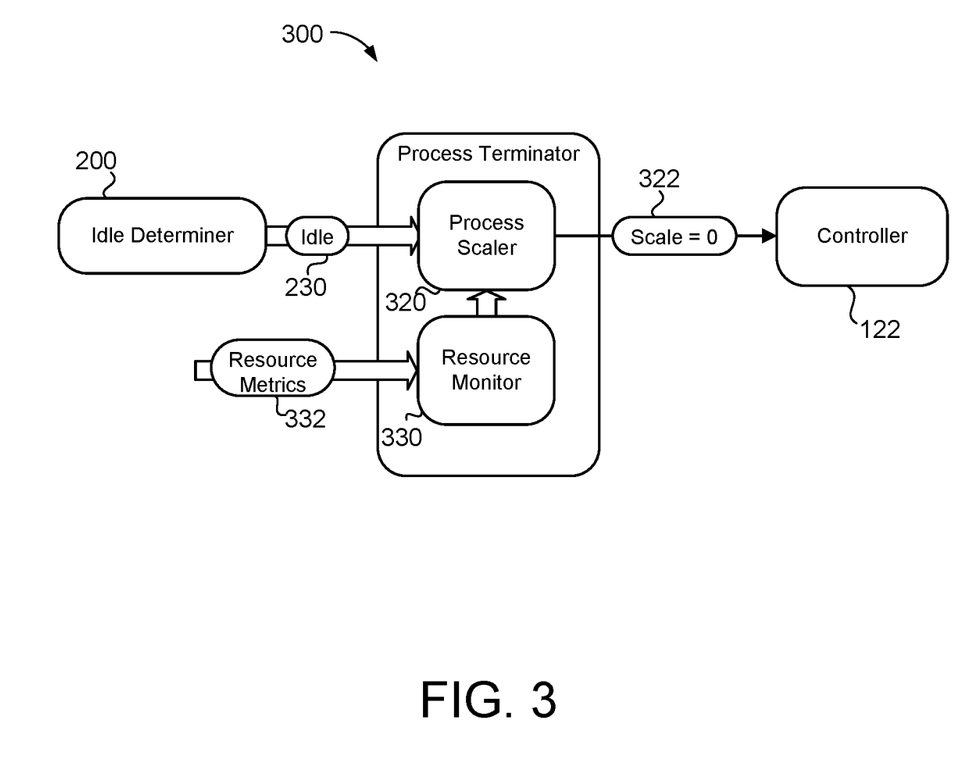
FIG. 3 is a schematic view of example components of a process terminator of the system of FIG. 1.

FIG. 3 shows the process terminator 300, in response to receiving the idle determination 230 from the idle determiner 200 indicating an idle resource controller 122, terminating (or otherwise suspending) the idle resource controller 122. For example, the process terminator 300 may include a process scaler 320 that sets the scale (e.g., deployment size) 322 of the controller 122 to zero. The scale 322 may determine the number of instances (e.g., pods 126) of the deployment 120, and thus a scale 322 of zero will remove (e.g., suspend/terminate execution) all instances (e.g., pods 126) of the deployment 120 (and the corresponding controller 122 and containers 128). In addition to the process scaler 320, the process terminator 300 may implement a resource monitor 330 that receives resource metrics 332 from the system 332. When the resource metrics 332 indicate that system resources are plentiful, the master controller 150 (via the process terminator 300) may determine that it is more desirable to maintain controllers 122 while in an idle state, rather than terminating the idle controllers 122 since recovering the resources reserved to the idle controllers 122 is less crucial while system resources are plentiful and costs incurred by redeploying previously terminated/suspended controllers 122 is avoided. Similarly, for controllers 122 that are known to frequently go from an idle state to an active state, the cost incurred by terminating execution of these controllers 122 that go idle only to redeploy the controllers 122 generally outweighs the benefits of recovering the unused resources while the controllers 122 are idle. Accordingly, implementations herein may include the process terminator 300 preventing terminating/suspending execution of controllers 122 that are known to frequently switch between idle and active states. The frequency of the controller switching between active and idle states may be predicted based on the type of container 128 executing in the corresponding pods 126 or based on historical data indicating how often the controller 122 is redeployed and/or how often events 125 watched by the controller 122 occur.

In some examples, the process terminator weighs the resource metrics 332 and the frequency that a given controller 122 is known or predicted to switch between active and idle states. In the example shown, the resource monitor 330 receives the system resource metrics 332 to determine if an amount of system resources available satisfies a threshold amount of resources. For instance, the threshold amount of resources may be satisfied when the amount of system resources available exceeds a value associated with the threshold amount of resources. Here, the process scaler 320 may determine to scale the controller 122 to zero (e.g., by setting the deployment size 322 to zero) to terminate the controller 122 when the idle determination 230 indicates that the controller 122 is idle and the amount of system resources available (e.g. provided in the resource metrics 332) fail to satisfy the threshold amount of resources. Otherwise, when the amount of system resources satisfy the threshold amount of resources, the process scaler 320 may maintain a current scaling of the controller 122 to prevent termination of the controller 122 despite the idle determination 230 indicating that the controller 122 is idle. In some implementations, the master controller 150 saves a state of the controller 122 prior to terminating, and when the controller 122 is redeployed, it is returned to the saved state (i.e., the controller 122 is suspended instead of terminated).

Figure 4:
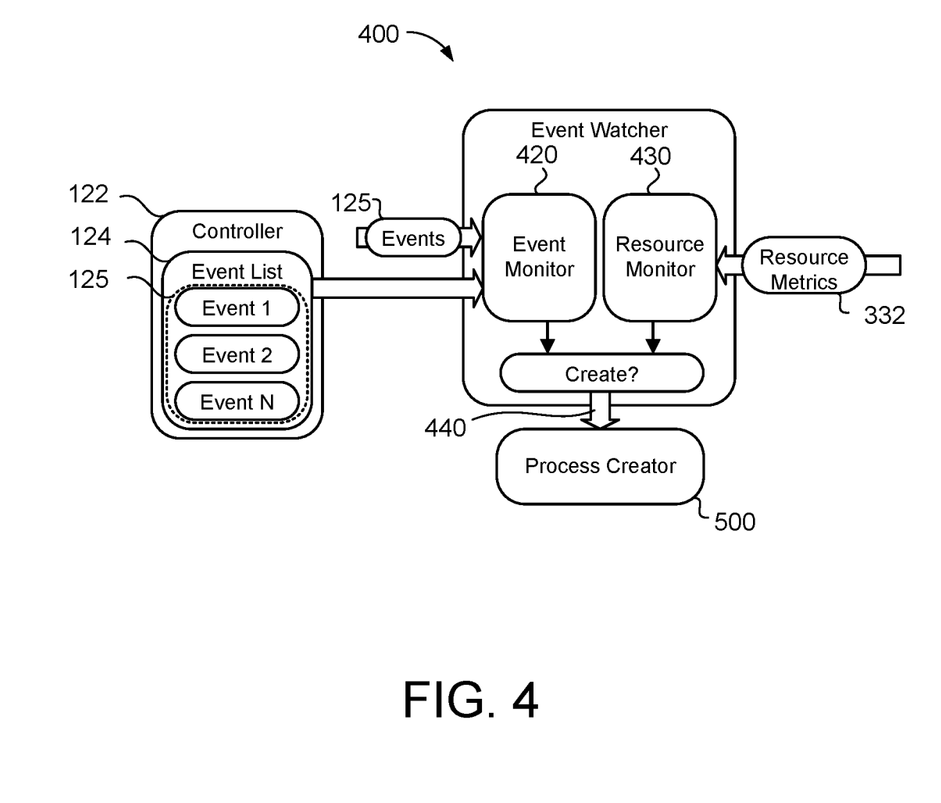
FIG. 4 is a schematic view of example components of an event watcher of the system of FIG. 1.

As set forth in the remarks above, terminating the controller 122 renders the controller 122 unavailable for responding to the occurrence of events 125 on the event-criteria list 124. To compensate for the terminated, and thus, unavailable controller 122, the event watcher 400 of the master controller 150 assumes the responsibility of the terminated controller 122 by watching for the occurrence of events 125 on the event-criteria list 124. Referring now to FIG. 4, the event watcher 400 of the master controller 150 includes an event monitor 420 that receives the event-criteria list 124 from the controller 122 prior to termination of the controller 122. In some examples, the event-criteria list 124 is executed through libraries, and thus the controller 122 does not require any code modifications to expose the respective event-criteria list 124 to the event watcher 400. The event monitor 420 also receives events 125 that occur within system 100 and determines if any of these events 125 include or correspond to an event 125 on the event-criteria list 124. The event-criteria list 124 may be dynamic in that the controller 122 may update its event-criteria list 124 at any point, for example in response to other events it may receive. The controller 122 may dynamically publish changes to the event-criteria list 124, or alternatively, the event watcher 400 may fetch the changes from the controller 122. In some examples, the event watcher 400 updates the event-criteria list 124 of a terminated controller 122 automatically based on resource metrics 332 or other inputs (i.e., creates resource-based events).

The event watcher 400, in the example shown, also includes a resource monitor 430. The resource monitor 430 of the event watcher 400 and the resource monitor 330 of the process terminator 300 may be the same component or different components. In some examples, the resource monitor 430 receives system resource metrics 332 to determine if there are sufficient system resources available to currently create a new deployment 120 (and subsequently, new controller 122). For example, the resource monitor 430 may override the redeployment of a deployment 120 if an amount of system resources available fails to satisfy a redeployment threshold amount of resources. For instance, the redeployment threshold amount of resources may fail to satisfy the threshold amount of resources when the amount of system resources available is less than a value associated with the redeployment threshold amount of resources. When the event monitor 420 determines that an event 125 on the event-criteria list 124 occurred and the resource monitor 430 determines that sufficient system resources are currently available (i.e., by satisfying the redeployment threshold amount of resources), the event watcher 400 sends a create or redeploy command 440 to the process creator 500 to redeploy the previously terminated/suspended controller 122. As described herein, redeploying a controller 122 results in redeploying the respective deployment 120 and corresponding target resources (e.g., pods 126 and respective containers 128) for execution on the remote system 114, thereby resulting in allocation of the system resources reserved by, and required for executing, the respective deployment 120 and corresponding pods 126. In scenarios when the event monitor 420 determines that an event 125 on the event-criteria list occurred but the resource monitor 430 determines that the amount of system resources is insufficient (e.g., the redeployment threshold amount of system resources is not satisfied), the system 100 may forego immediately redeploying the controller 122 and take a number of different actions. For example, the system 100 may queue redeployment of the controller 122, adjust the value for the redeployment threshold amount of system resources, or modify timers such as idle timers shortened to more aggressively terminate idle controllers 122.

Figure 5:
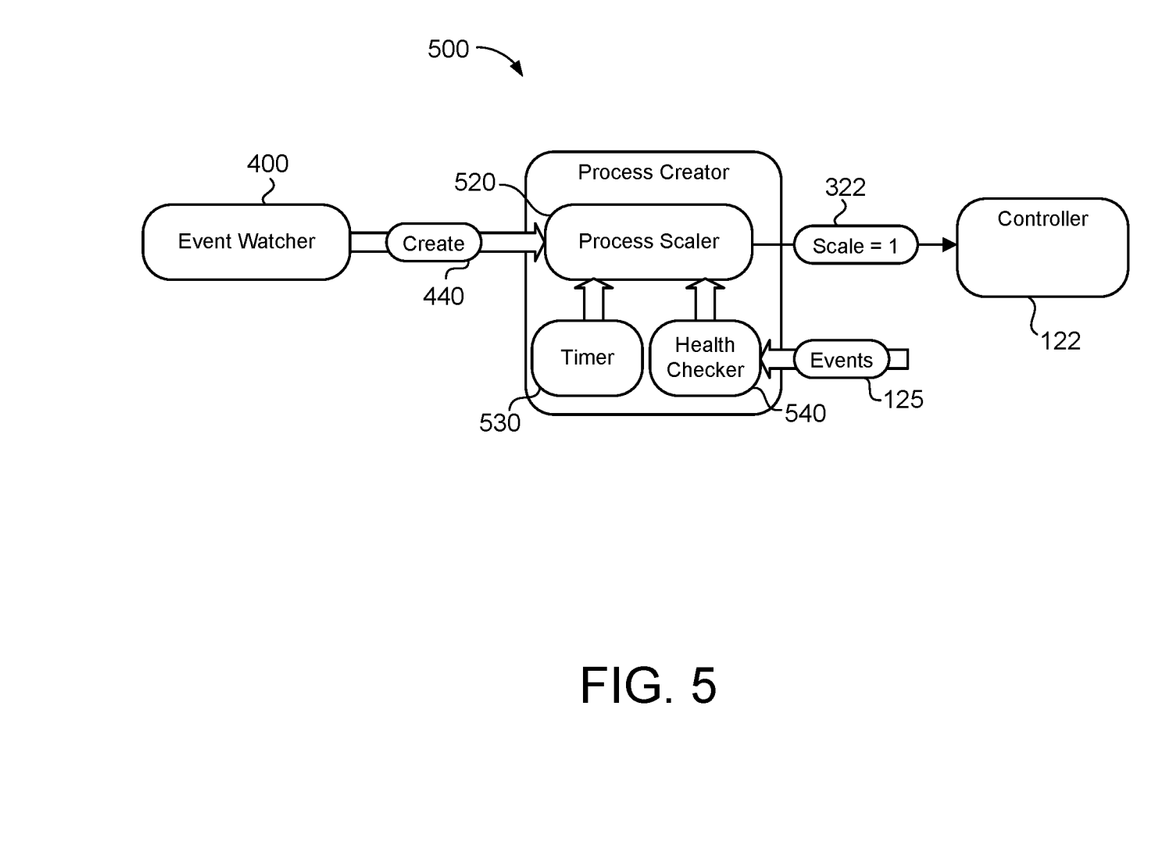
FIG. 5 is a schematic view of example components of a process creator of the system of FIG. 1.

FIG. 5 shows the process creator 500 receiving the create/redeploy command 440 from the event watcher 400. In some implementations, the process creator 500 implements a process scaler 520 that receives the command 440. The process scaler 520 and the process scaler 320 of the process terminator 300 may be the same component or different components. In the example shown, the process scaler 520 of the process creator 500 increases the scale 322 (e.g., increases the deployment size 322) of the deployment 120 or controller 122. For example, the scale 322 is increased by setting the deployment size 322 from zero to one or some other integer greater than one. This has the effect of recreating or redeploying the previously terminated controller 122, whereby the value of the scale 322 indicates the number of pods 126 (e.g., instances) to redeploy for execution within the deployment 120 for control by the corresponding controller 122. The increased value of the scale 322 set by the process creator 500 to redeploy the controller 122 may correspond to a number of pods 126 associated with the deployment 120 prior to terminating execution of the deployment 120 or controller 122. When a controller 122 is created (such as when the scale 322 changes from zero to one), the controller 122 will execute a reconciliation loop (or other self-healing mechanism) in order to determine a desired state for the deployment 120 and the actual state of the deployment 120, and reconciles the differences between the two. Using this reconciliation, the controller 122 will discover and/or learn of the event 125 that triggered the redeployment of the deployment 120 and the controller 122. Thus, there may be no need for the master controller 150 to update or inform the controller 122 of past events.

In the example shown, the process creator 500 also implements a timer 530. The timer 530 allows the process creator to 500 periodically redeploy a controller 122 without requiring a triggering event 125. That is, the processor creator 500 may determine if a terminate time period since the resource controller 122 has terminated satisfies a threshold period of time, and in response, recreate the pod 126. For example, it may be desirable to redeploy a controller 122 once every ten minutes to allow for a reconciliation loop even if the event watcher 400 has not detected an event 125 on the event-criteria list 124. This may help achieve "drift-fixing" or allow for periodic operations such as backups. Each controller 122 may indicate if such assistance is necessary and the master controller 150 can react accordingly. That is, each controller 122 may indicate to the master controller 150 if the controller 122 requires periodic operations or not, and the master controller 150 then responds to that indication accordingly. In some implementations, the controller 122 may indicate time-based periodic event-criteria, or an event-criteria that matches at a certain time. For example, the controller 122 may set a periodic event to schedule reconciliation every 10 minutes or, in another example, schedule an event to become valid at 2 AM for a daily backup. A periodic schedule or a time based strategy of arbitrary complexity may be expressed as the next scheduled event. The master controller 150 may consider the time remaining until the next time-based event when evaluating whether to terminate a pod 126.

With continued reference to FIG. 5, in some implementations, the process creator 500 also includes a health checker 540. The health checker 540 receives the system events 125 and may determine a controller 122 should be redeployed based on an event 125 even if the event 125 is not on the event-criteria list 124. For example, the health checker 540 may determine that a controller should be redeployed for maintenance or reconfiguration when a power failure event or network failure event is received. As a further example, the master controller 150 may determine that a newer software version or configuration of the controller 122 should be installed. After redeploying the deployment 120, the idle determiner 200 again determines when the deployment 120 reverts back to idle.

In other implementations, each controller 122 is configured to run in a "one-shot" mode. That is, the pod 126 or container 128 execute until each application (executing within the containers 128) in the deployment 120 achieves a steady state (i.e., idle state), and the controller 122 then automatically exits. The controller may additionally inform the master controller 150 of process completion. The master controller 150 may then assume watching for events 125 associated with the terminated controller 122 and redeploy the deployment 120 when a triggering event 125 occurs.

In some examples, the master controller 150 acts as a scheduler for deployments 120 or target resources 126 (e.g., pods). That is, the master controller 150 may coordinate the deployment of controllers 122 to limit total resource (e.g., memory) use. For example, if an event 125 occurs that triggers the deployment of multiple controllers 122 simultaneously, the master controller 150 may gracefully schedule the deployment of each controller 122 to adapt to the available resources.

Figure 6:
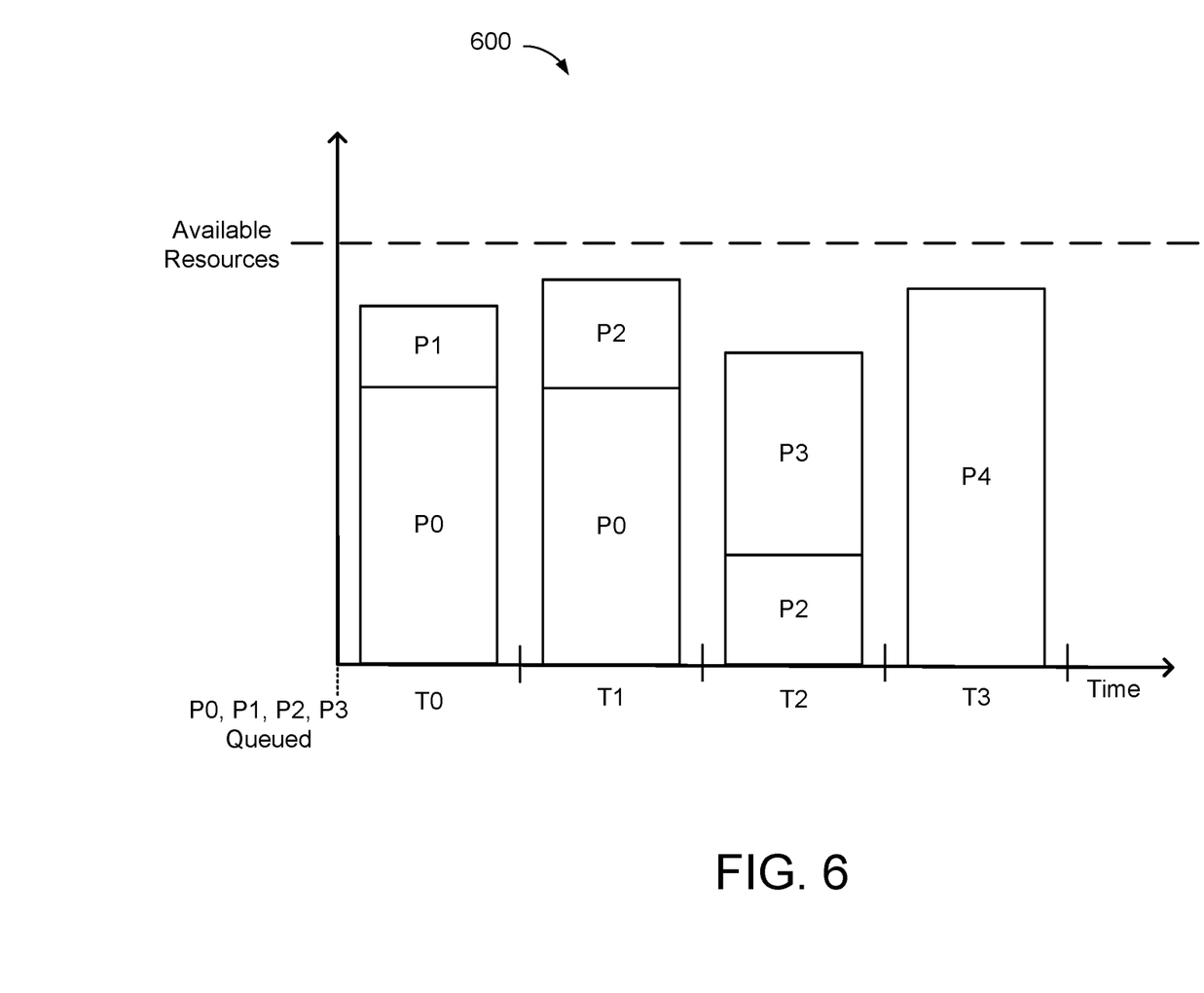
FIG. 6 is a plot of resource availability over time for an example system for conserving resources in containerized systems.

Referring now to FIG. 6, a plot 600 depicts resource availability over time for an example system 100 executing multiple pods 126. The horizontal x-axis depicts time and the vertical y-axis depicts resource consumption. The plot 600 may be described with reference to the system 100 of FIG. 1. The system 100 may create/instantiate multiple pods 126 each including a group of one or more containers 128 with isolated resources (e.g., computing, memory, storage, network access, etc.) and a corresponding resource controller 122 that controls the one or more pods 126. Each container 128 within a pod 126 may encapsulate a corresponding application to provide a secure execution environment for the corresponding application. When provisioning pods 126, the system 100 typically considers a total amount of available system resources and then schedules the creation of pods 126 so that an amount of system resources reserved for use by the created pods 126 does not exceed the total amount of available system resources. Dashed horizontal line indicates the total amount of available system resources. Specifically, at time period T0, pods P0, P1 are executing and P2, P3, P4 are queued and scheduled to execute. Since executing pods P2-P4 along with pods P0, P1 during time period T0 would exceed the total amount of available system resources, initiating execution of each of the pods P2-P4 is delayed, e.g., by designating pods P2-P4 in a queue so that execution of the pods P2-P4 occurs at times after time period T0 when a sufficient amount of system resources is available.

At time period T1, execution of pod P1 completes and the system 100 terminates pod P1, thereby relieving a sufficient amount of system resources available for executing pod P2 without exceeding the total amount of available system resources. Accordingly, the system 100 initiates execution of pod P2 while pod P0 continues to execute during time T1. At time period T2, execution of pod P0 completes and the system 100 terminates pod P1, thereby relieving a sufficient amount of system resources available for executing pod P3 without exceeding the total amount of available system resources. Finally, at time period T3, execution of pods P2, P3 completes and the system terminates pods P2, P3, thereby relieving a sufficient amount of system resources available for executing pod P4 without exceeding the total amount of system resources. In this way, the system 100 may gracefully schedule allocation of finite system resources for use by multiple pods 126 each including a corresponding group of one or more containers 128 and a corresponding resource controller 122 for controlling the one or more pods 126.

Deployments or target resources 126 (e.g., pods) may be scheduled in any number of ways. For example, the system 100 may use round-robin, weighted round robin, first in first out, etc. Controllers 122 may have an associated priority, and controllers 122 associated with higher priorities that have been terminated (e.g., due to being in an idle state) are redeployed before controllers 122 associated with lower priorities. The priorities may be set (e.g., by a system administrator) or determined automatically by the system 100. In some examples, the priority is assigned based on time sensitivity of the containers 128 (i.e., applications). That is, the less time sensitive an application is, the less priority it will be assigned. In some implementations, the master controller 150 may leverage functionality of the scheduler, such as targeting controllers 122 to operate within a resource-constrained quota or low-priority scheduling class, or mark the controllers 122 as good candidates for eviction. The master controller 150 may also operate as an extension to the scheduler, to implement behavior that cannot easily be implemented in the generic scheduler.

Figure 7:
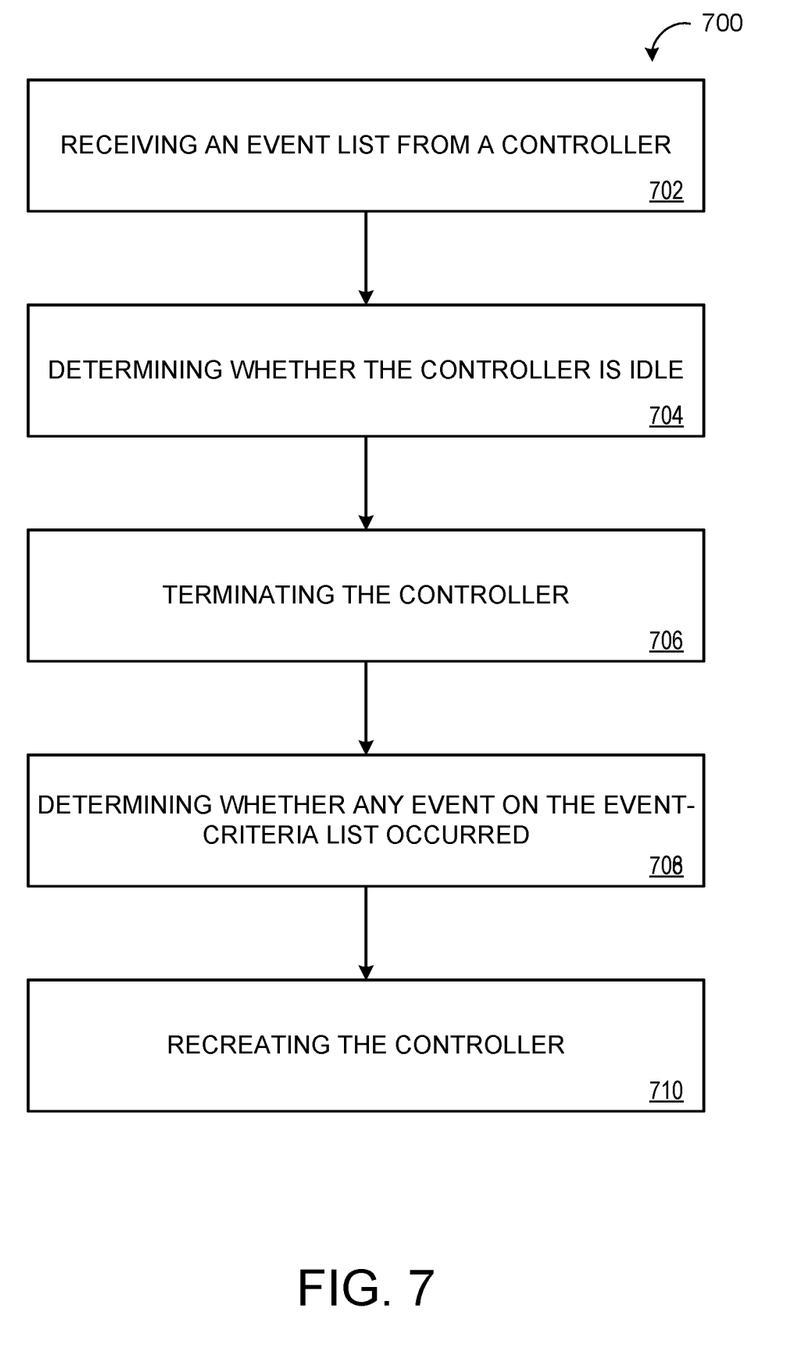
FIG. 7 is a flowchart of an example method for conserving resources in containerized systems.

FIG. 7 is a flowchart of an example method 700 for conserving resources in a distributed system. The flowchart starts at operation 702 by receiving, at data processing hardware 810 (FIG. 8), an event-criteria list 124 from a controller 122. The event-criteria list 124 describes one or more events 125 watched by the resource controller 122 and the resource controller 122 is configured to respond to events 125 matching the event-criteria list 124 that occur. The event-criteria list 124 may include a timer event. The event-criteria list 124 may also include a dynamic event-criteria list. In some implementations, the method 700 includes receiving a plurality of event-criteria lists 124 from a plurality of resource controllers 122 executing simultaneously, each event-criteria list 124 associated with a respective resource controller 122. A quantity of resource controllers 122 executing simultaneously may be restricted based upon a total amount of available system resources. In some examples, receiving the event-criteria list 124 from the resource controller 122 includes retrieving the event-criteria list 124 from an HTTP endpoint.

At step 704, the method 700 includes determining, by the data processing hardware 810, whether the resource controller 122 is idle. In some examples, the method 700 includes polling 214 the resource controller 122 to determine whether the resource controller 122 is idle. In other examples, the method 700 includes analyzing events 125 that have occurred during a threshold period of time and determining that the resource controller 122 is idle when no events 125 on the event-criteria list 124 have occurred within the threshold period of time.

When the resource controller 122 is idle, the method 700 includes, at step 706, terminating, by the data processing hardware 810, the resource controller 122. In some implementations, a master controller 150 determines when the resource controller 122 is idle and terminates the resource controller by setting (e.g. scaling) a deployment size 322 of the resource controller 122 to zero. Prior to terminating the resource controller 122 when the resource controller 122 is idle, the method 700 optionally includes determining, by the data processing hardware 810, whether a measure of system resources 332 satisfies a system resource threshold. For instance, the system resource threshold may be satisfied when the measure of system resources 332 presently in use or reserved for use by the system 100 exceeds a value corresponding to the system resource threshold. When both the measure of system resources 332 satisfies the threshold and the resource controller 122 is idle, the method 700 includes terminating the resource controller 122. The measure of system resources 332 may include a measure of system processing/computing, network access, storage, and/or memory resources.

At step 708, the method 700 includes determining, by the data processing hardware 801, whether any event 125 from the event-criteria list 124 occurs after terminating the resource controller 122. The method 700 may include polling data to determine whether any events 125 have occurred. When at least one event 125 from the event-criteria list 124 occurred after terminating the resource controller 122, the method 700 includes, at step 710, recreating, by the data processing hardware 810, the resource controller 122. For example, recreating the resource controller 122 may include redeploying (e.g., via the master controller 150 executing on the data processing hardware 810) the resource controller 122 by setting (e.g., scaling) the deployment size 322 of the controller 122 from zero to one (or some other integer greater than one depending upon a number of instances/pods 126 to be redeployed and controlled by the controller 122). The resource controller 122 may be associated with a system resource reservation and terminating the resource controller 122 may remove the system resource reservation. The system resource reservation may indicate a magnitude and/or type of system resources the resource controller 122 and associated pods 126 require when in use.

In some implementations, the method 700 includes determining, by the data processing hardware 810, whether a terminate time period since the resource controller 122 has been terminated satisfies a threshold period of time, and, in response to determining that the terminate time period does satisfy the threshold period of time, recreating, by the data processing hardware 810, the resource controller 122. In some examples, the method 700 includes determining, by the data processing hardware 810, whether the resource controller 122 requires maintenance or reconfiguration. In these examples, in response to determining that the resource controller 122 does require maintenance or reconfiguration, the method 700 then includes recreating, by the data processing hardware 810, the resource controller 122.

Optionally, the method 700 may include determining, by the data processing hardware 810, whether any event 125 on multiple event-criteria lists 124 occurred simultaneously. In response to determining that an event 125 on multiple event-criteria lists 124 occurred simultaneously, the method 700 then includes recreating, by the data processing hardware 810, a group of resource controllers 122 sequentially, each resource controller 122 of the group of resource controllers 122 associated with a respective event-criteria list 124 of the multiple event-criteria lists 124. Recreating the group of resource controllers 122 sequentially may include recreating the group of resource controllers 122 sequentially based on a priority of each resource controller 122. In other examples, the method 700 includes recreating, by the data processing hardware 118, the resource controller 122 based on a system metric 332. The system metric 332 may include a measure of system resources.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

Figure 8:
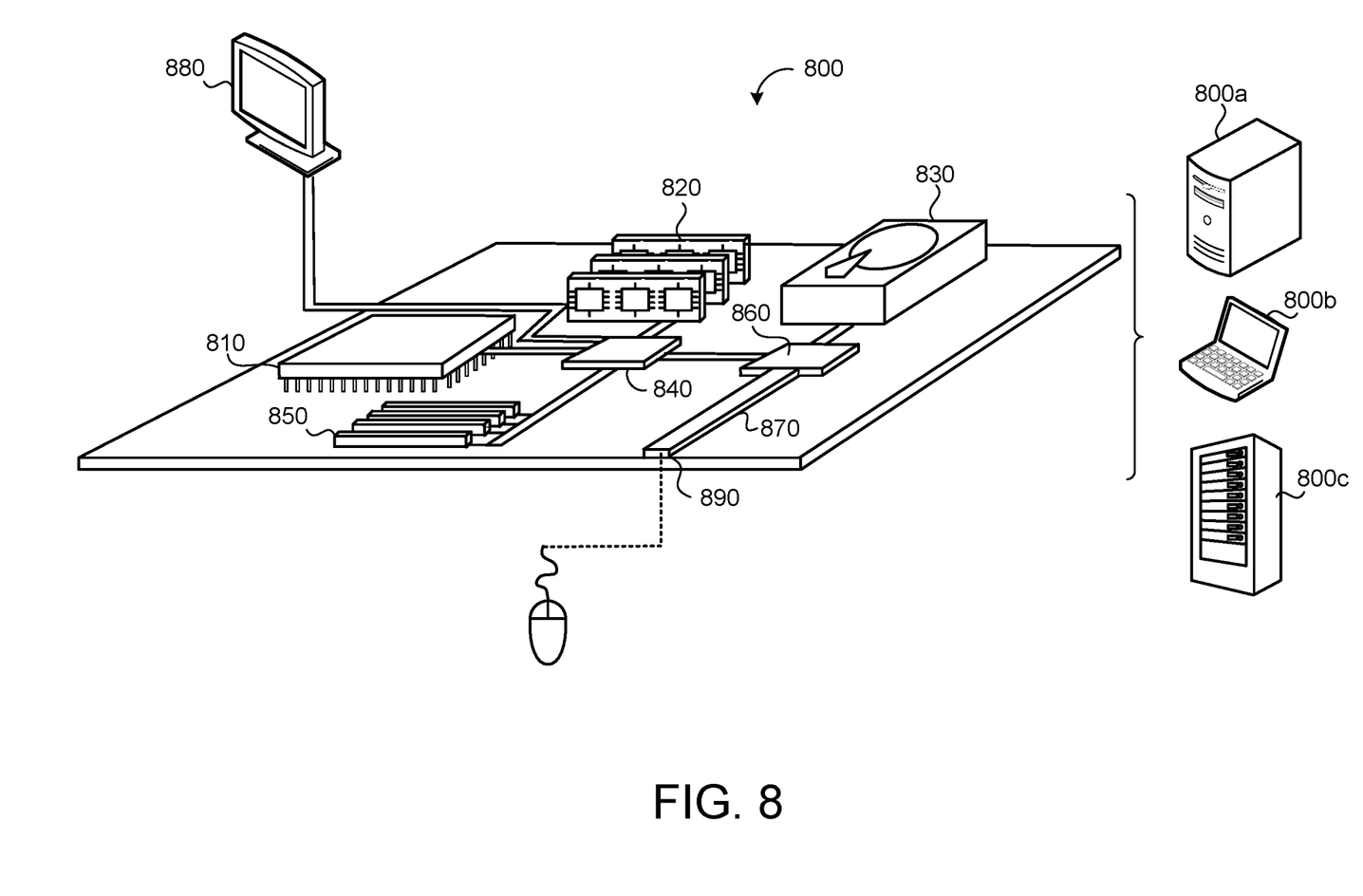
FIG. 8 is a schematic view of an example computing device that may be used to implement the systems and methods described herein.

FIG. 8 is schematic view of an example computing device 800 that may be used to implement the systems and methods described in this document. The computing device 800 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 800 includes a processor 810 (e.g., data processing hardware), memory 820 (e.g., memory hardware), a storage device 830, a high-speed interface/controller 840 connecting to the memory 820 and high-speed expansion ports 850, and a low speed interface/controller 860 connecting to a low speed bus 870 and a storage device 830. Each of the components 810, 820, 830, 840, 850, and 860, are interconnected using various busses, and may be mounted on a common motherboard or in other manners as appropriate. The processor 810 can process instructions for execution within the computing device 800, including instructions stored in the memory 820 or on the storage device 830 to display graphical information for a graphical user interface (GUI) on an external input/output device, such as display 880 coupled to high speed interface 840. In other implementations, multiple processors and/or multiple buses may be used, as appropriate, along with multiple memories and types of memory. Also, multiple computing devices 800 may be connected, with each device providing portions of the necessary operations (e.g., as a server bank, a group of blade servers, or a multi-processor system).

The memory 820 stores information non-transitorily within the computing device 800. The memory 820 may be a computer-readable medium, a volatile memory unit(s), or non-volatile memory unit(s). The non-transitory memory 820 may be physical devices used to store programs (e.g., sequences of instructions) or data (e.g., program state information) on a temporary or permanent basis for use by the computing device 800. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 830 is capable of providing mass storage for the computing device 800. In some implementations, the storage device 830 is a computer-readable medium. In various different implementations, the storage device 830 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 820, the storage device 830, or memory on processor 810.

The high speed controller 840 manages bandwidth-intensive operations for the computing device 800, while the low speed controller 860 manages lower bandwidth-intensive operations. Such allocation of duties is exemplary only. In some implementations, the high-speed controller 840 is coupled to the memory 820, the display 880 (e.g., through a graphics processor or accelerator), and to the high-speed expansion ports 850, which may accept various expansion cards (not shown). In some implementations, the low-speed controller 860 is coupled to the storage device 830 and a low-speed expansion port 890. The low-speed expansion port 890, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 800 may be implemented in a number of different forms, as shown in the figure. For example, it may be implemented as a standard server 800a or multiple times in a group of such servers 800a, as a laptop computer 800b, or as part of a rack server system 800c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method when executed by data processing hardware causes the data processing hardware to perform operations comprising:
   receiving an event-criteria list from a resource controller, the event-criteria list comprising one or more events watched by the resource controller, the resource controller controlling a pod comprising one or more containers, each container executing a respective application;
   determining that the resource controller is in an idle state; and
   based on determining that the resource controller is in the idle state:
      determining a first cost, the first cost representing an amount of system resources required to maintain the resource controller in the idle state;
      determining a second cost, the second cost representing an amount of system resources required to terminate the resource controller and subsequently redeploy the resource controller;
      determining that the first cost is less than the second cost; and
      based on determining that the first cost is less than the second cost, preventing termination of the resource controller.

2. The computer-implemented method of claim 1, wherein determining that the resource controller is in the idle state comprises polling the resource controller.

3. The computer-implemented method of claim 1, wherein determining that the resource controller is in the idle state comprises:
   analyzing events that have occurred during a threshold period of time; and determining that the resource controller is idle in the idle state when no events on the event-criteria list have occurred within the threshold period of time.

4. The computer-implemented method of claim 1, wherein the event-criteria list comprises a timer event.

5. The computer-implemented method of claim 1, wherein receiving the event-criteria list from the resource controller comprises receiving a plurality of event-criteria lists from a plurality of resource controllers executing simultaneously, each event-criteria list associated with a respective resource controller.

6. The computer-implemented method of claim 5, wherein a quantity of the resource controllers executing simultaneously is based upon a total amount of available system resources.

7. The computer-implemented method of claim 1, wherein the event-criteria list comprises a dynamic event-criteria list.

8. The computer-implemented method of claim 1, wherein the operations further comprise determining the first cost based on a frequency of the resource controller switching between the idle state and an active state.

9. The computer-implemented method of claim 8, wherein the operations further comprise predicting the frequency based on historical data.

10. A system comprising:
data processing hardware; and
memory hardware in communication with the data processing hardware, the memory hardware storing instructions that when executed on the data processing hardware cause the data processing hardware to perform operations comprising:
receiving an event-criteria list from a resource controller, the event-criteria list comprising one or more events watched by the resource controller, the resource controller controlling a pod comprising one or more containers, each container executing a different application;
determining that the resource controller is in an idle state; and
based on determining that the resource controller is in the idle state:
determining a first cost, the first cost representing an amount of system resources required to maintain the resource controller in the idle state;
determining a second cost, the second cost representing an amount of system resources required to terminate the resource controller and subsequently redeploy the resource controller;
determining that the first cost is less than the second cost; and
based on determining that the first cost is less than the second cost, preventing termination of the resource controller.

11. The system of claim 10, wherein determining that the resource controller is in the idle state comprises polling the resource controller.

12. The system of claim 10, wherein determining that the resource controller is in the idle state comprises:
analyzing events that have occurred during a threshold period of time; and
determining that the resource controller is idle in the idle state when no events on the event-criteria list have occurred within the threshold period of time.

13. The system of claim 10, wherein the event-criteria list comprises a timer event.

14. The system of claim 10, wherein receiving the event-criteria list from the resource controller comprises receiving a plurality of event-criteria lists from a plurality of resource controllers executing simultaneously, each event-criteria list associated with a respective resource controller.

15. The system of claim 14, wherein a quantity of the resource controllers executing simultaneously is based upon a total amount of available system resources.

16. The system of claim 10, wherein the event-criteria list comprises a dynamic event-criteria list.

17. The system of claim 10, wherein the operations further comprise determining the first cost based on a frequency of the resource controller switching between the idle state and an active state.

18. The system of claim 17, wherein the operations further comprise predicting the frequency based on historical data.

* * * * *